United States Patent
Tsao

(10) Patent No.: US 10,021,074 B2
(45) Date of Patent: Jul. 10, 2018

(54) ENCRYPTING METHOD AND DECRYPTING METHOD OF SECURITY SHORT MESSAGE AND RECEIVING APPARATUS FOR RECEIVING SECURITY SHORT MESSAGE

(71) Applicant: Getac Technology Corporation, Hsinchu County (TW)

(72) Inventor: Hsuan-Wei Tsao, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 190 days.

(21) Appl. No.: 15/078,360

(22) Filed: Mar. 23, 2016

(65) Prior Publication Data

US 2017/0279776 A1 Sep. 28, 2017

(51) Int. Cl.
*H04L 29/06* (2006.01)
*H04L 9/06* (2006.01)

(52) U.S. Cl.
CPC ........ *H04L 63/0428* (2013.01); *H04L 9/0631* (2013.01); *H04L 9/0643* (2013.01); *H04L 63/123* (2013.01)

(58) Field of Classification Search
None
See application file for complete search history.

(56) References Cited

U.S. PATENT DOCUMENTS

| | | | |
|---|---|---|---|
| 8,478,310 B2* | 7/2013 | Reding | H04M 1/72552 370/466 |
| 9,544,747 B2* | 1/2017 | Stuntebeck | H04W 4/14 |
| 2004/0111749 A1* | 6/2004 | Zhang | H04N 7/17336 725/87 |
| 2012/0117385 A1* | 5/2012 | Bryson | H04L 9/3226 713/168 |
| 2016/0309331 A1* | 10/2016 | Moon | H04W 12/08 |
| 2017/0118647 A1* | 4/2017 | Stuntebeck | H04W 12/06 |
| 2017/0279776 A1* | 9/2017 | Tsao | H04L 63/0428 |

* cited by examiner

*Primary Examiner* — Christopher Revak
(74) *Attorney, Agent, or Firm* — Locke Lord LLP; Tim Tingkang Xia, Esq.

(57) ABSTRACT

An encrypting method of a security short message includes performing a first encryption computation according to a short message content and a deadline code to generate a verification code, performing a second encryption computation according to the short message content, deadline code and verification code to generate an encrypting field, and combining a non-encrypting field and the encrypting field to create the security short message.

21 Claims, 5 Drawing Sheets

ENCRYPTING METHOD AND DECRYPTING METHOD OF SECURITY SHORT MESSAGE AND RECEIVING APPARATUS FOR RECEIVING SECURITY SHORT MESSAGE

BACKGROUND OF THE INVENTION

Field of the Invention

The present invention relates to encrypting methods and decrypting methods of short messages and receiving apparatuses for receiving short messages and, more particularly, to an encrypting method and decrypting method of a security short message and a receiving apparatus for receiving a security short message to enhance security and privacy.

Description of the Prior Art

Due to communication-related technological advancements, conventional modes of mobile communication are no longer restricted to static IP connection, and the applications of mobile communication devices are becoming wider. Among various services of mobile communication, short message service serves as an alternative to phone calls and thereby remains indispensable to mobile communication.

Due to technological advancements, contents transmitted by short message service are increasingly diversified, evolving from early short message service whereby text-based messages are transmitted to later multimedia short message service whereby multimedia files, such as pictures, voices and videos, are transmitted.

Short message service systems of conventional mobile devices have drawbacks in terms of the privacy and security of short messages. For example, with a short message service system being an application, contents of a short message can still be intercepted with a built-in program of mobile devices and therefore maliciously copied and saved on the other devices. Furthermore, the contents of a short message used by a conventional short message service system are mostly plaintext and do not undergo encryption or format conversion, and in consequence the short message is likely to be cracked by a third party. Moreover, a conventional short message service system never verifies the purposes of short messages sent and therefore always poses a security risk; for instance, a short message intended to be sent to a first device may be wrongly sent to a second device, thereby allowing the second device to receive and read the short message. Also, after receiving a short message inclusive of an execution instruction, a conventional short message service system always executes the execution instruction right away without examining related information available at the transmitting end, and in consequence the third party is able to control mobile devices through the short message easily. Last but not least, the conventional short message service system never verifies the sending time of a short message, thereby increasing the chance that the same short message will affect mobile devices repeatedly.

SUMMARY OF THE INVENTION

In view of the aforesaid drawbacks of the prior art, the present invention provides an encrypting method and decrypting method of a security short message and a receiving apparatus for receiving the security short message to generate a security short message of a special format by performing two stages of encryption such that, after receiving the security short message, the receiving apparatus has to perform a related decryption operation for decrypting the security short message in order to read a short message content of the security short message, thereby enhancing the security and privacy of the short message service in its entirety.

In an embodiment, an encrypting method of a security short message comprises the steps of: performing a first encryption computation according to a short message content and a deadline code to generate a verification code; performing a second encryption computation according to the short message content, the deadline code and the verification code to generate an encrypting field; and combining a non-encrypting field and the encrypting field to create the security short message.

In an embodiment, a decrypting method of a security short message, applicable to a receiving apparatus, comprises the steps of: receiving the security short message, wherein the security short message comprises a non-encrypting field and an encrypting field; confirming a short message format supported by the receiving apparatus according to the non-encrypting field, wherein the short message format is unique to the security short message; decrypting the encrypting field in the security short message with a decrypting key to obtain a verification code, a deadline code and a short message content; confirming that the security short message has not been tampered with according to the verification code, the deadline code and the short message content; and executing the short message content if the security short message has not been tampered with. The security short message comprises a non-encrypting field and the encrypting field. The short message format is unique to the security short message.

In an embodiment, a receiving apparatus for receiving a security short message comprises a receiving unit, a processing unit and an executing unit. The receiving unit receives the security short message and confirms that a short message format of the security short message is supported by the receiving apparatus. The security short message comprises a non-encrypting field and an encrypting field. The processing unit decrypts the encrypting field in the security short message with a decrypting key to obtain a verification code, a deadline code and a short message content and confirms that the security short message has not been tampered with according to the verification code, the deadline code and the short message content. The executing unit confirms that the security short message has not been tampered with and then executes the short message content.

In conclusion, according to embodiments of the present invention, an encrypting method and decrypting method of a security short message and a receiving apparatus for receiving the security short message are characterized in that: a short message content and a deadline code are encrypted to generate a verification code such that another encryption operation is performed according to the verification code, the short message content and the deadline code to generate the security short message provided with two stages of encryption protection; the security short message can be decrypted only with a specific decrypting key of the receiving apparatus; the receiving apparatus confirms whether the security short message has been tampered with according to the verification code, deadline code and short message content in the security short message; and the short message content will be executed only if the receiving apparatus confirms that the security short message has not been tampered with, thereby enhancing the security and privacy of the short message service in its entirety. Moreover, the receiving apparatus further confirms whether a validity deadline of the security short message has passed according to the deadline code in the security short message, so as to further enhance the security of the short message service in its entirety.

The fine structures and advantages of the present invention are sufficiently illustrated with embodiments below to allow persons skilled in the art to gain insight into the technical contents of the present invention and implement the present invention accordingly. Furthermore, persons skilled in the art readily understand related objectives and advantages of the present invention by making reference to the disclosure contained in the specification, claims, and drawings of the present invention.

DETAILED DESCRIPTION OF THE EMBODIMENTS

Figure 1:
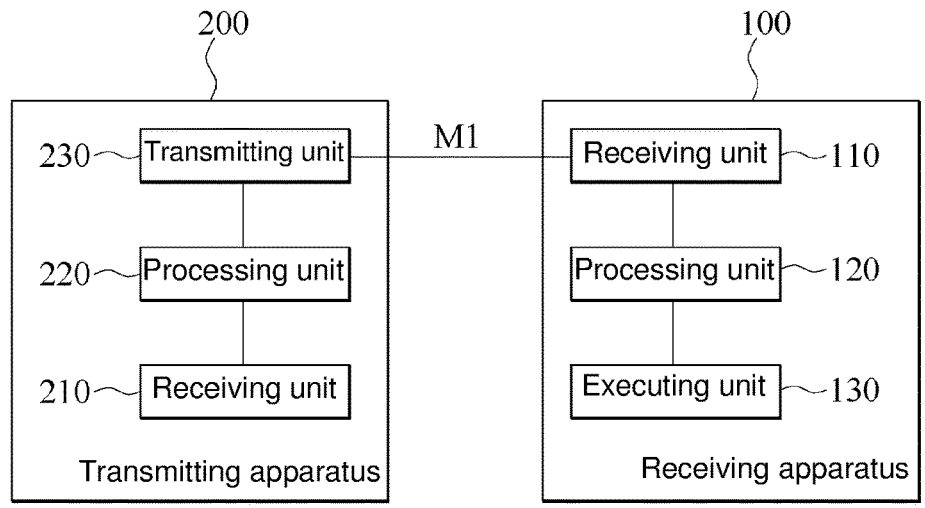
FIG. 1 is a block diagram of a transmitting apparatus and a receiving apparatus according to an embodiment of the present invention.

Referring to FIG. 1, which is shown a block diagram of a transmitting apparatus and a receiving apparatus according to an embodiment of the present invention. As shown in the diagram, a communication system comprises a receiving apparatus 100 and a transmitting apparatus 200. The receiving apparatus 100 and the transmitting apparatus 200 communicate with each other (wirelessly). The receiving apparatus 100 comprises a receiving unit 110, a processing unit 120 and an executing unit 130. The processing unit 120 is coupled to the receiving unit 110 and the executing unit 130. The transmitting apparatus 200 comprises a receiving unit 210, a processing unit 220 and a transmitting unit 230. The processing unit 220 is coupled to the receiving unit 210 and the transmitting unit 230. Before sending a message to the receiving apparatus 100, the transmitting apparatus 200 encrypts the message (hereinafter referred to as the short message content) according to the encrypting method of security short message M1 of any embodiment to thereby create security short message M1 and then wirelessly sends security short message M1 to the receiving unit 110 of the receiving apparatus 100. After receiving security short message M1, the receiving unit 110 decrypts security short message M1 according to the decrypting method of security short message M1 of any embodiment, so as to obtain a short message content from the transmitting apparatus 200.

Both the receiving apparatus 100 and the transmitting apparatus 200 are mobile phones and computers. Moreover, the processing unit 120 of the receiving apparatus 100 and the processing unit 220 of the transmitting apparatus 200 are systems on chip (SoC), central processing units (CPU) or micro control units (MCU), but the present invention is not limited thereto.

Figure 2:
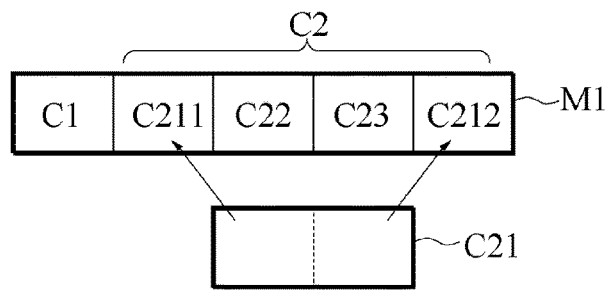
FIG. 2 is a schematic view of the format of a security short message according to an embodiment of the present invention.

FIG. 2 is a schematic view of the format of a security short message according to an embodiment of the present invention. Security short message M1 essentially comprises non-encrypting field C1 and encrypting field C2. Encrypting field C2 comprises verification code C21, deadline code C22 and short message content C23. Verification code C21 is further divided into at least two verification segments (hereinafter referred to as first verification segment C211 and second verification segment C212). The number of bits of first verification segment C211 and the number of bits of second verification segment C212 are flexibly adjustable. For example, when the number of bits of verification code C21 is 32 bits, first verification segment C211 and second verification segment C212 each take up 16 bits; alternatively, first verification segment C211 takes up 20 bits, and second verification segment C212 takes up 12 bits; alternatively, first verification segment C211 takes up 10 bits, and second verification segment C212 takes up 22 bits.

Figure 3:
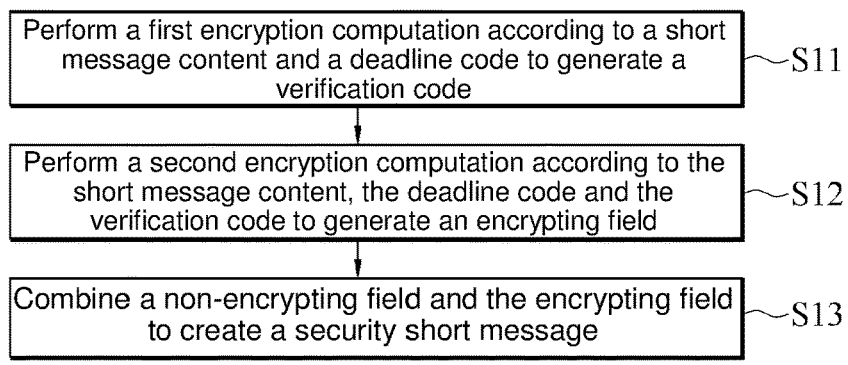
FIG. 3 is a flowchart of an encrypting method of a security short message according to an embodiment of the present invention.

FIG. 3 is a flowchart of an encrypting method of a security short message according to an embodiment of the present invention. In step S11, the encrypting method of a security short message M1 comprises the step of performing a first encryption computation according to short message content C23 and deadline code C22 to generate verification code C21. For example, in an embodiment of step S11, the transmitting apparatus 200 encrypts short message content C23 and deadline code C22 received by the receiving unit 210 by performing the first encryption computation through the processing unit 220 to generate verification code C21. The short message content C23 is a message entered by a user, such as "Hello", and its length depends on the length of the message entered by the user.

The first encryption computation aims to provide first-stage encryption protection for security short message M1 and entails converting short message content C23 and deadline code C22 of a variable length into verification code C21 of an invariable length, such as 32 bits.

In an embodiment, the first encryption computation is a Cyclic Redundancy Check (CRC) computation, such as a Message-Digest Algorithm, including MD5, MD4, MD3, or a Secure Hash Algorithm (SHA), including SHA-3, SHA-2, SHA-1, but the present invention is not limited thereto. The first encryption computation is any encoding algorithm that converts a message of a variable length into one of an invariable length.

In step S12, a second encryption computation is performed according to short message content C23, deadline code C22 and verification code C21 to generate encrypting field C2. The deadline code C22 enables the receiving apparatus 100 to check the validity of short message content C23, whereas the verification code C21 enables the receiving apparatus 100 to check the correctness of short message content C23 and deadline code C22, so as to prevent a third party from tampering with short message content C23. In an embodiment, deadline code C22 comprises a sending time and a validity deadline. The sending time is either the point in time when the user presses a send button after executing short message content C23 or a sending date predetermined by the user. The validity deadline is a specific date such as Dec. 31, 2016 or a specific duration such as seven days.

In an embodiment of step S12, the transmitting apparatus 200 encrypts first verification segment C211, deadline code C22, short message content C23 and second verification segment C212 through the second encryption computation performed by the processing unit 220, so as to generate encrypting field C2. The second encryption computation aims to provide second-stage encryption protection for security short message M1 and entails converting first verification segment C211, deadline code C22, short message content C23 and second verification segment C212 from plaintext into ciphertext to hide a genuine content, so as to prevent divulgence which might otherwise occur in the course of transmission. In an embodiment, the second encryption computation is an Advanced Encryption Standard, an RSA encrypting algorithm or a Caesar cipher, but the present invention is not limited thereto. The second encryption computation is any algorithm for converting plaintext into ciphertext.

Finally, in step S13, non-encrypting field C1 and encrypting field C2 are combined to create security short message M1. In an embodiment of step S13, the transmitting apparatus 200 combines non-encrypting field C1 and encrypting field C2 already converted into ciphertext to create security short message M1 via the processing unit 220, and then the transmitting unit 230 of the transmitting apparatus 200 sends security short message M1. The non-encrypting field C1 is generally known as header and identified by the receiving apparatus 100 to thereby determine whether its system supports a short message format of security short message M1. In an embodiment, the short message format is a text-based short message format or a multimedia-based short message format.

The present invention is technically characterized in that first verification segment C211 and second verification segment C212 alternate with short message content C23 and deadline code C22 to enhance the protection strength of security short message M1. For example, first verification segment C211, deadline code C22, second verification segment C212 and short message content C23 are arranged in accordance with the aforesaid sequence to thereby separate deadline code C22 from short message content C23, but the present invention is not limited thereto. In another embodiment illustrated with FIG. 2, first verification segment C211, deadline code C22, short message content C23 and second verification segment C212 are arranged in sequence. Therefore, deadline code C22 and short message content C23 are positioned between first verification segment C211 and second verification segment C212. In each of the aforesaid embodiments, deadline code C22 and short message content C23 replace each other in sequence, so do first verification segment C211 and second verification segment C212.

Figure 4:
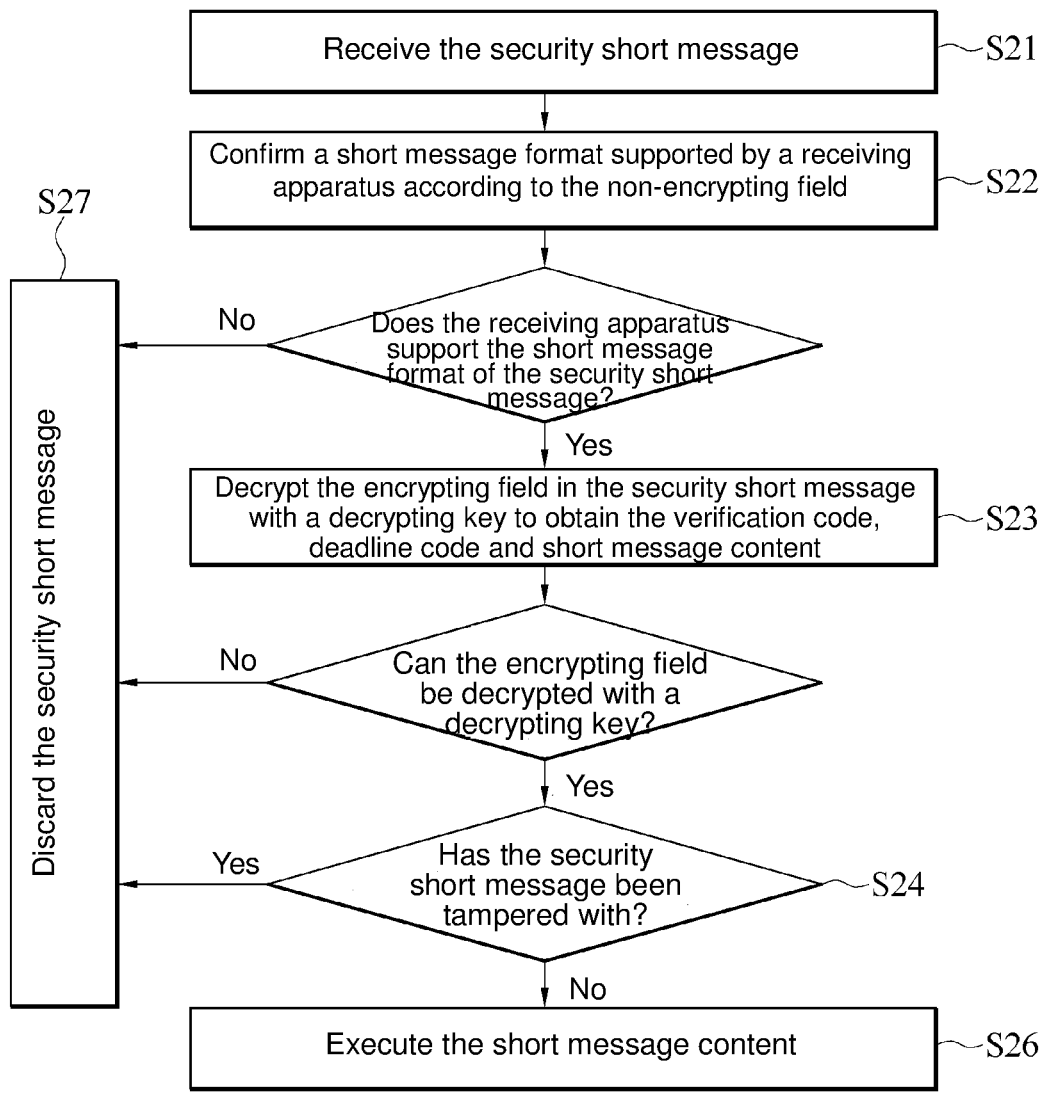
FIG. 4 is a flowchart of a decrypting method of a security short message according to the first embodiment of the present invention.

FIG. 4 is a flowchart of a decrypting method of a security short message according to the first embodiment of the present invention. Referring to FIG. 1, FIG. 2 and FIG. 4, the decrypting method of security short message M1 comprises the steps of: receiving the security short message (step S21); confirming a short message format supported by the receiving apparatus 100 according to non-encrypting field C1 (step S22); decrypting encrypting field C2 in security short message M1 with a decrypting key to obtain verification code C21, deadline code C22 and short message content C23 (step S23); confirming whether security short message M1 has been tampered with (step S24); and executing short message content C23 if security short message M1 has not been tampered with (step S26).

In an embodiment of step S21, the receiving unit 110 of the receiving apparatus 100 receives security short message M1 from the transmitting apparatus 200. Security short message M1 comprises non-encrypting field C1 and encrypting field C2 which are arranged in sequence. Security short message M1 is sent in the form of a packet from the transmitting apparatus 200 to the receiving apparatus 100.

In an embodiment of step S22, since non-encrypting field C1 in security short message M1 is plaintext (i.e., not encrypted), the receiving unit 110 of the receiving apparatus 100 determines whether it supports the short message format of security short message M1 directly according to non-encrypting field C1 of security short message M1.

If the receiving unit 110 of the receiving apparatus 100 determines that the short message format of security short message M1 is supported by the receiving apparatus 100 according to non-encrypting field C1, the process flow of the method will go to step S23. Conversely, if the receiving unit 110 of the receiving apparatus 100 determines that the short message format of security short message M1 is not supported by the receiving apparatus 100, security short message M1 will be discarded (step S27). To discard security short message M1, the receiving unit 110 of the receiving apparatus 100 directly refuses to receive security short message M1.

In an embodiment of step S23, since encrypting field C2 in security short message M1 is ciphertext (i.e., encrypted), it cannot be directly read. Therefore, the processing unit 120 of the receiving apparatus 100 must have a pre-stored decrypting key for decrypting encrypting field C2 in security short message M1 and thereby converting encrypting field C2 into plaintext, so as to obtain verification code C21, deadline code C22 and short message content C23.

In an embodiment, a plurality of decrypting keys is pre-stored in the receiving apparatus 100, whereas the processing unit 120 of the receiving apparatus 100 conducts a test to determine whether any one of the decrypting keys decrypts encrypting field C2 of security short message M1.

If the processing unit 120 decrypts encrypting field C2 with the decrypting key and thereby obtains verification code C21, deadline code C22 and short message content C23, it indicates that: the receiving apparatus 100 has the decrypting key corresponding to security short message M1 and therefore is a valid (correct) receiving end; and the transmitting apparatus 200 which send security short message M1 is a valid (correct) transmitting end. At this point in time, the process flow of the method goes to step S24.

Conversely, if the processing unit 120 fails to decrypt encrypting field C2 with any decrypting key, it indicates that either the receiving apparatus 100 lacks the decrypting key which corresponds to security short message M1 and therefore is an invalid (incorrect) receiving end or the transmitting apparatus 200 which sends security short message M1 is an invalid (incorrect) transmitting end. Meanwhile, the process flow of the method goes to step S27 to discard security short message M1.

In an embodiment of step S24, the processing unit 120 of the receiving apparatus 100 conducts a test according to verification code C21, deadline code C22 and short message content C23 which are obtained when decrypted with the decrypting key, so as to confirm whether security short message M1 has been tampered with by a third party. Verification code C21 serves to test for the correctness of short message content C23 and deadline code C22. Deadline code C22 serves to test for the validity of short message content received. Short message content C23 is the message content received.

In an embodiment, verification code C21 in security short message M1 is divided into at least two verification segments (hereinafter referred to as first verification segment C211 and second verification segment C212), as shown in FIG. 2. Deadline code C22 and short message content C23 are positioned between first verification segment C211 and second verification segment C212. The number of bits of first verification segment C211 and the number of bits of second verification segment C212 are flexibly adjustable.

Therefore, before confirming whether security short message M1 has been tampered with, the processing unit 120 of the receiving apparatus 100 has to combine first verification segment C211 and second verification segment C212 to create verification code C21. The processing unit 120 puts second verification segment C212 behind first verification segment C211. The most significant bit (MSB) in second verification segment C212 is put behind the least significant bit (LSB) in first verification segment C211.

Figure 5:
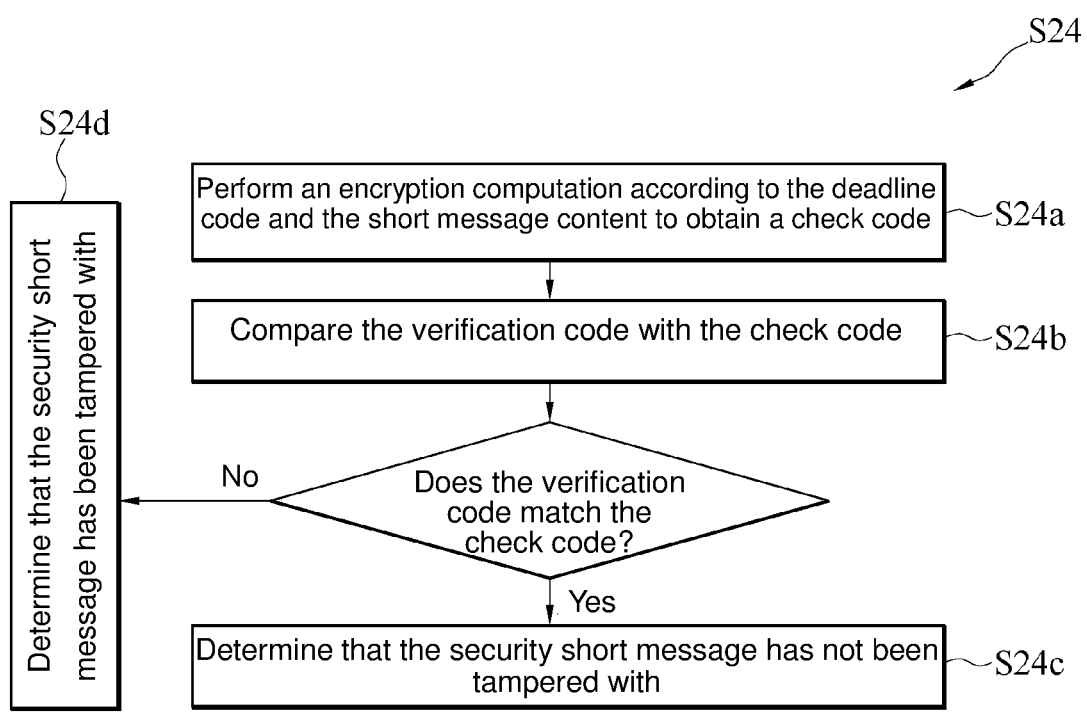
FIG. 5 is a flowchart related to step S24 and depicted in FIG. 4.

FIG. 5 is a flowchart related to step S24 and depicted in FIG. 4. Referring to FIG. 5, in an embodiment of step S24, the processing unit 120 executes an encryption computation according to deadline code C22 and short message content C23 to obtain the check code (step S24a) and then compares verification code C21 with the check code (step S24b). If the result of comparison shows that verification code C21 matches the check code, the processing unit 120 will determine that security short message M1 has not been tampered with (step S24c). Conversely, if the result of comparison shows that verification code C21 does not match the check code, the processing unit 120 will determine that security short message M1 has been tampered with (step S24d).

In an embodiment of step S24a, the processing unit 120 of the receiving apparatus 100 encrypts deadline code C22 and short message content C23 through an encryption computation to obtain the check code. The check code has a fixed length value. The bit length of the check code equals the bit length of verification code C21.

In an embodiment, the encryption computation is a Cyclic Redundancy Check (CRC) computation. The same message content must generate the same code when processed with the same algorithm computation; hence, the type of encryption computation applicable to the processing unit 120 of the receiving apparatus 100 is the same as the type of the first encryption computation applicable to the processing unit 220 of the transmitting apparatus 200, so as to facilitate the comparison process performed in step S24b and related to verification code C21. For example, assuming that the first encryption computation applicable to the processing unit 220 of the transmitting apparatus 200 is SHA-3, the encryption computation applicable to the processing unit 120 of the receiving apparatus 100 must be SHA-3 too.

In an embodiment of step S24b, the processing unit 120 of the receiving apparatus 100 compares the check code obtained in step S24a with verification code C21 in security short message M1 to confirm whether the check code matches verification code C21 and thereby determine whether security short message M1 has been tampered with.

If the processing unit 120 confirms that verification code C21 matches the check code, the process flow of the method of the present invention will go to step S24C, and the processing unit 120 will determine that security short message M1 has not been tampered with. After the processing unit 120 has determined that security short message M1 was not tampered with, security short message M1 is sent to the executing unit 130, and then the process flow of the method goes to step S26.

In step S26, the executing unit 130 of the receiving apparatus 100 receives security short message M1 from the processing unit 120 and executes short message content C23 in security short message M1.

Conversely, if the processing unit 120 confirms that verification code C21 does not match the check code, the process flow of the method will go to step S24d, and the processing unit 120 will determine that security short message M1 has been tampered with. After the processing unit 120 has determined that security short message M1 was tampered with, the processing unit 120 does not send security short message M1 to the executing unit 130, but the process flow of the method goes to step S27 to thereby discard security short message M1.

Figure 6:
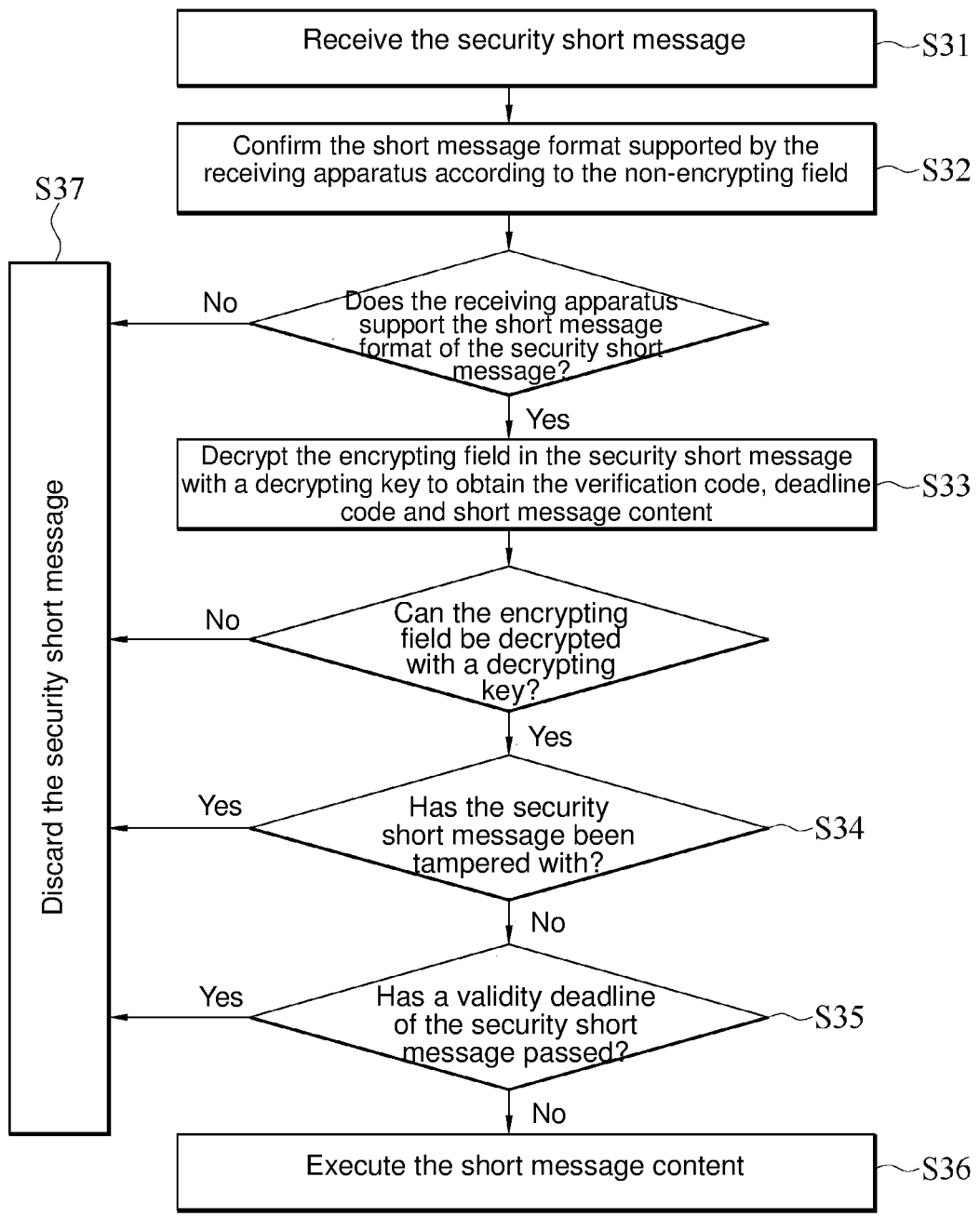
FIG. 6 is a flowchart of the decrypting method of a security short message according to the second embodiment of the present invention.

FIG. 6 is a flowchart of the decrypting method of a security short message according to the second embodiment of the present invention. In an embodiment, Referring to FIG. 1, FIG. 2 and FIG. 6, the decrypting method of security short message M1 comprises the steps of: receiving security short message (step S31); confirming short message format supported by the receiving apparatus 100 according to non-encrypting field C1 (step S32); decrypting encrypting field C2 in security short message M1 with a decrypting key to obtain verification code C21, deadline code C22 and short message content C23 (step S33); confirming whether security short message M1 has been tampered with (step S34); confirming whether a validity deadline of security short message M1 has passed (step S35); and executing short message content C23 if security short message M1 has not been tampered with and the validity deadline of security short message has not passed (step S36).

Figure 7:
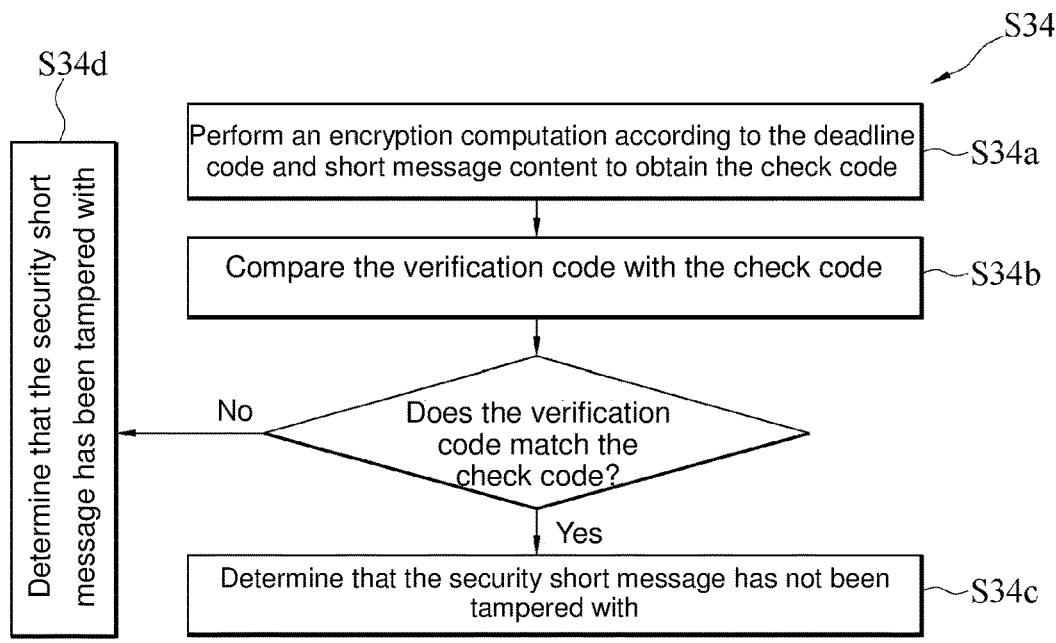
FIG. 7 is a flowchart related to step S34 and depicted in FIG. 6.

FIG. 7 is a flowchart related to step S34 and depicted in FIG. 6. Referring to FIG. 7, in an embodiment of step S34, the processing unit 120 performs an encryption computation according to deadline code C22 and short message content C23 to obtain the check code (step S34a), compares verification code C21 with the check code (step S34b), determines that security short message M1 has not been tampered with if the result of comparison shows that verification code C21 matches the check code (step S34c), and determines that security short message M1 has been tampered with if the result of comparison shows that verification code C21 does not match the check code (step S34d).

Since step S31, step S32, step S33, step S34, step S36 and step S37 are substantially identical to step S21, step S22, step S23, step S24, step S26 and step S27, respectively, some of them are not reiterated below.

Unlike the preceding embodiment, the embodiment below provides a decrypting method of security short message M1 which further comprises step S35 and requires that step S36 will occur only upon completion of step S34 and step S35, that is, the process flow of the method goes to step S36 only upon confirmation that security short message M1 has not been tampered with (i.e., step S34) and that the validity deadline of security short message M1 has not passed (i.e., step S35).

Moreover, as disclosed by the flowchart shown in FIG. 6, step S34 is followed by step S35, but the present invention is not limited thereto. In a variant embodiment of the present invention, step S34 precedes or follows step S35. In another variant embodiment of the present invention, step S34 and step S35 occur simultaneously.

The description below is based on the flowchart shown in FIG. 6, starting from step S35 (i.e., presumably, it is confirmed that the short message format of security short message M1 is supported by the receiving apparatus 100, security short message M1 is decrypted with the decrypting key, and security short message has not been tampered with.) Step S31, step S32, step S33 and step S34 are substantially identical to step S21, step S22, step S23 and step S24, respectively.

In an embodiment of step S35, the processing unit 120 confirms whether the validity deadline of security short message M1 has passed according to deadline code C22 and the current time of the receiving apparatus 100. Deadline code C22 comprises the sending time and the validity deadline of security short message M1. The sending time is either the point in time when the user presses a send button after having finished the execution of short message content C23 or is a sending date predetermined by the user. The validity deadline is a specific date or a specific duration.

Figure 8:
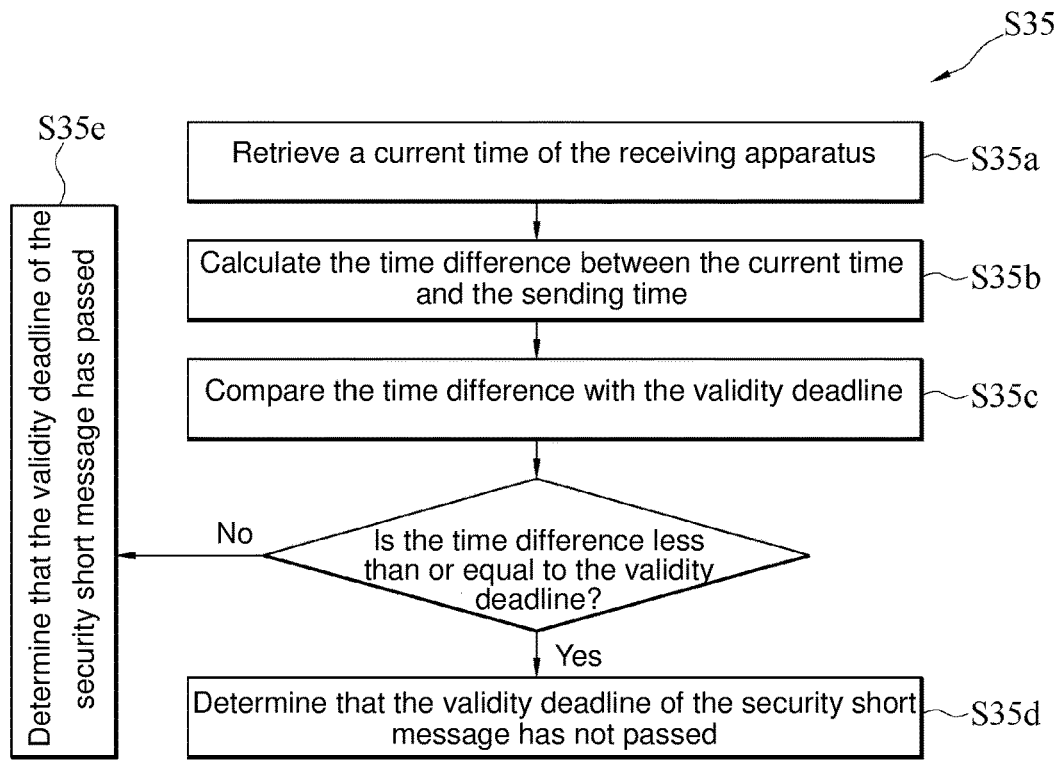
FIG. 8 is a flowchart related to step S35 and depicted in FIG. 6.

FIG. 8 is a flowchart related to step S35 and depicted in FIG. 6. Referring to FIG. 8, in an embodiment of step S35, the processing unit 120 retrieves the current time of the receiving apparatus 100 (step S35a), calculates the time difference between the current time and the sending time (step S35b), compares the time difference with the validity deadline (step S35c), determines that the validity deadline of security short message M1 has not passed if the time difference is less than or equal to the validity deadline (step S35d), and determines that the validity deadline of security short message M1 has passed if the time difference is larger than the validity deadline (step S35e).

In step S35a, the processing unit 120 retrieves a current time of the receiving apparatus 100. The current time is the point in time when the processing unit 120 performs the retrieval operation, such as Feb. 1, 2016.

In an embodiment, the processing unit 120 gains access to the current time of the receiving apparatus 100 through a positioning module (not shown) and/or a network module (not shown) of the receiving apparatus 100. The network module is a wireless network or Wifi. The positioning module is a global positioning system (GPS).

In step S35b, the processing unit 120 calculates a time difference according to the current time obtained in step S35a and the sending time stated in deadline code C22 and attributed to security short message M1.

For example, assuming that the sending time stated in deadline code C22 in security short message M1 is Jan. 30, 2016, and the current time retrieved by the processing unit 120 is Feb. 1, 2016, the processing unit 120 can calculate the time difference between the current time and the sending time to be three days (inclusive of the sending date.)

Although in the aforesaid embodiment the minimum unit of both the current time and the sending time are related to a specific day, the present invention is not limited thereto. Therefore, the minimum unit of both the current time and the sending time can also be related to a specific hour, minute or even second.

In step S35c, the processing unit 120 compares the time difference calculated in step S35b with the validity deadline stated in deadline code C22 in security short message M1 to determine whether the validity deadline of security short message M1 has passed.

For example, assuming that the time difference thus calculated is three days, and that the validity deadline stated in deadline code C22 is seven days, the processing unit 120 can compare the time difference with the validity deadline and then confirm that the validity deadline of security short message M1 has not passed and therefore security short message M1 is still valid.

Therefore, step S34 involves confirming that security short message M1 has not been tampered with, whereas step S35 involves confirming that the validity deadline of security short message M1 has not passed. Step S35 is followed by step S36.

In step S36, the executing unit 130 of the receiving apparatus 100 receives security short message M1 from the processing unit 120 and executes short message content C23 in security short message M1.

Conversely, if the processing unit 120 confirms that the time difference calculated is less than or equal to the validity deadline, the process flow of the method will go to step S35d, and the processing unit 120 will determine that the validity deadline of security short message M1 has not passed. For example, if the time difference calculated is three days and the validity deadline stated in deadline code C22 is one day, the processing unit 120 will compare the time difference with the validity deadline and then determine that the validity deadline of security short message M1 has passed and therefore security short message M1 is invalid. Therefore, step S35d is followed by step S37 to discard security short message M1.

In conclusion, according to an embodiment of the present invention, an encrypting method and decrypting method of a security short message and a receiving apparatus for receiving the security short message are characterized in that: a short message content and a deadline code are encrypted to generate a verification code such that another encryption operation is performed according to the verification code, the short message content and the deadline code to generate the security short message provided with two stages of encryption protection; the security short message can be decrypted only with a specific decrypting key of the receiving apparatus; the receiving apparatus confirms whether the security short message has been tampered with according to the verification code, deadline code and short message content in the security short message; and the short message content will be executed only if the receiving apparatus confirms that the security short message has not been tampered with, thereby enhancing the security and privacy of the short message service in its entirety. Moreover, the receiving apparatus further confirms whether a validity deadline of the security short message has passed according to the deadline code in the security short message, so as to further enhance the security of the short message service in its entirety.

Although the present invention is disclosed above by preferred embodiments, the embodiments are not restrictive of the present invention. Any persons skilled in the art can make some changes and modifications to the embodiments without departing from the spirit and scope of the present invention. Accordingly, the legal protection for the present invention should be defined by the appended claims.

What is claimed is:

1. An encrypting method of a security short message, comprising the steps of:
performing a first encryption computation according to a short message content and a deadline code to generate a verification code, wherein each of the short message content and the deadline code has a variable length and the verification code has an invariable length;
performing a second encryption computation according to the short message content, the deadline code and the verification code to generate an encrypting field, wherein the verification code is divided into a first verification segment and a second verification segment; and the first verification segment is separated from the second verification segment by at least one of the deadline code and the short message content; the second encryption computation converts each of the first verification segment, the deadline code, the short message content and the second verification segment from a plaintext format into a ciphertext format; and combining a non-encrypting field and the encrypting field to create the security short message.

2. The encrypting method of a security short message according to claim 1, wherein the deadline code and the short message content are positioned between the first verification segment and the second verification segment.

3. The encrypting method of a security short message according to claim 2, wherein a sum of a number of bits of the first verification segment and a number of bits of the second verification segment is constant, whereas the number of bits of the first verification segment and the number of bits of the second verification segment are flexibly adjustable.

4. The encrypting method of a security short message according to claim 1, wherein the deadline code comprises a sending time and a validity deadline.

5. The encrypting method of a security short message according to claim 1, wherein the first encryption computation is one of a Message-Digest Algorithm and a Secure Hash Algorithm.

6. The encrypting method of a security short message according to claim 5, wherein the second encryption computation is one of an Advanced Encryption Standard, an RSA Encryption Algorithm, and a Caesar Cipher.

7. A decrypting method of a security short message, applicable to a receiving apparatus, the decrypting method comprising the steps of:
receiving the security short message, wherein the security short message comprises a non-encrypting field and an encrypting field;
confirming a short message format supported by the receiving apparatus according to the non-encrypting field, wherein the short message format is unique to the security short message;
decrypting the encrypting field in the security short message with a decrypting key to obtain a verification code, a deadline code and a short message content, wherein each of the short message content and the deadline code has a variable length and the verification code has an invariable length;
confirming that the security short message has not been tampered with according to the verification code, the deadline code and the short message content,
wherein the verification code is divided into a first verification segment and a second verification segment; and the first verification segment is separated from the second verification segment by at least one of the deadline code and the short message content; and
wherein each of the first verification segment, the deadline code, the short message content and the second verification segment is converted from a plaintext format into a ciphertext format; and
executing the short message content if the security short message has not been tampered with.

8. The decrypting method of a security short message according to claim 7, wherein the step of confirming that the security short message has not been tampered with according to the verification code, the deadline code and the short message content further comprises the steps of:
performing an encryption computation according to the deadline code and the short message content to obtain a check code;
comparing the verification code with the check code; and
determining that the security short message has not been tampered with if the verification code matches the check code.

9. The decrypting method of a security short message according to claim 7, wherein the deadline code comprises a sending time and a validity deadline, and the decrypting method further comprises the steps of:
retrieving a current time of the receiving apparatus;
calculating a time difference between the current time and the sending time;
comparing the time difference with the validity deadline; and
determining that the validity deadline of the security short message has not passed if the time difference is less than or equal to the validity deadline,
wherein the step of executing the short message content will perform only if the security short message has not been tampered with and the validity deadline of the security short message has not passed.

10. The decrypting method of a security short message of claim 9, further comprising the step of:
discarding the security short message if the short message format of the security short message is not supported by the receiving apparatus, the receiving apparatus lacks the decrypting key, the security short message has been tampered with, or the validity deadline of the security short message has passed.

11. The decrypting method of a security short message according to claim 7, wherein the deadline code and the short message content are positioned between the first verification segment and the second verification segment.

12. The decrypting method of a security short message according to claim 7, wherein a sum of a number of bits of the first verification segment and a number of bits of the second verification segment is constant, whereas the number of bits of the first verification segment and the number of bits of the second verification segment are flexibly adjustable.

13. A receiving apparatus for receiving a security short message, comprising a processor programmed to:
receive the security short message and confirming that a short message format of the security short message is supported by the receiving apparatus, wherein the security short message comprises a non-encrypting field and an encrypting field, wherein each of the short message content and the deadline code has a variable length and the verification code has an invariable length;
decrypt the encrypting field in the security short message with a decrypting key to obtain a verification code, a deadline code and a short message content and confirming that the security short message has not been tampered with according to the verification code, the deadline code and the short message content, wherein each of the short message content and the deadline code has a variable length and the verification code has an invariable length;
wherein the verification code is divided into a first verification segment and a second verification segment and the first verification segment is separated from the second verification segment by at least one of the deadline code and the short message content; and
wherein each of the first verification segment, the deadline code, the short message content and the second verification segment is converted from a plaintext format into a ciphertext format; and
confirm that the security short message has not been tampered with and then executing the short message content.

14. The receiving apparatus for receiving a security short message according to claim 13, wherein the processor is further programmed to confirm whether the short message format of the security short message is supported by the receiving apparatus according to the non-encrypting field.

15. The receiving apparatus for receiving a security short message according to claim 13, wherein the processor is further programmed to perform an encryption computation according to the deadline code and the short message content to obtain a check code and then compares the check code with the verification code to determine whether the check code matches the verification code and thereby confirm that the security short message has not been tampered with.

16. The receiving apparatus for receiving a security short message according to claim 15, wherein the encryption computation is a Cyclic Redundancy Check (CRC) computation.

17. The receiving apparatus for receiving a security short message according to claim 13, wherein the deadline code comprises a sending time and a validity deadline, and, after retrieving a current time of the receiving apparatus, the processing unit calculates a time difference between the current time and the sending time to confirm that the validity deadline of the security short message has not passed according to the time difference, wherein the executing unit executes the short message content after having confirmed that the time difference is less than or equal to the validity deadline and the security short message has not been tampered with.

18. The receiving apparatus for receiving a security short message according to claim 13, wherein the security short message will be discarded if the processor is programmed to confirm that the short message format of the security short message received is not supported by the receiving apparatus.

19. The receiving apparatus for receiving a security short message according to claim 13, wherein the security short message will be discarded if the processing unit fails to decrypt the security short message.

20. The receiving apparatus for receiving a security short message according to claim 13, wherein the deadline code and the short message content are positioned between the first verification segment and the second verification segment.

21. The receiving apparatus for receiving a security short message according to claim 13, wherein a sum of a number of bits of the first verification segment and a number of bits of the second verification segment is constant, whereas the number of bits of the first verification segment and the number of bits of the second verification segment are flexibly adjustable.

* * * * *